SOLID STATE ELECTRONIC DEVICES, METHOD AND APPARATUS

Filed March 29, 1965

Inventor:
William R. Hiatt,
by [signature]
His Attorney.

United States Patent Office 3,324,531

Patented June 13, 1967

3,324,531

SOLID STATE ELECTRONIC DEVICES, METHOD AND APPARATUS

William R. Hiatt, Utica, N.Y., assignor to General Electric Company, a corporation of New York Filed Mar. 29, 1965, Ser. No. 443,503
4 Claims. (Cl. 29—155.5)

The present invention relates generally to the art of solid state electronics and is more particularly concerned with novel solid state devices incorporating thin insulating films and having unique electrical properties, and is also concerned with new methods for the production of these devices and with the use of these devices for information storage in electrical equipment for processing digitally-coded data.

In the course of examining the negative resistance characteristics of niobium-niobium oxide-gold thin film devices, I made the surprising and unpredicted discovery that under certain circumstances, diode devices having thin insulating niobium oxide films between pairs of electrodes of certain types will exhibit a bistable characteristic. Thus, some specific sandwich-like thin film devices will have a double value dependence of current versus voltage. This double value dependence represents two distinct electrical conduction states of these devices. Moreover, these devices may be switched by an electrical pulse from one such state to the other. Further, I have found that this bistable characteristic, while common to a number of combinations of electrodes, will vary rather widely both in terms of the current-voltage relation defining either state and in terms of the power required to switch the device from one stable state to the other. The most favorable device of this type from the standpoint of switching power requirements and speed of operation is the one which incorporates a bismuth counterelectrode and a niobium-base electrode.

While these first devices of mine were erratic in their electrical behavior, I subsequently discovered that if they were produced in accordance with the critical procedural steps of the novel process of this invention they would consistently exhibit bistability with the two conduction states being clearly distinguishable.

These present novel devices will remain in whichever conduction state is desired without the expenditure of electrical or other energy and, moreover, the present state of such a device can be determined electrically without switching the device to the other state. Still further, these devices may be produced in accordance with the present process so that their characteristics and foregoing advantages are all consistently obtained and the resulting memory arrays or other devices or apparatus incorporating these elements will be free from erratic performance or results attributable in any way to the nature or character of performance of these bistable devices or elements.

In discovering these new devices, I first found that by carrying out a further breakdown step in the process disclosed and claimed in the copending application of Thomas W. Hikmott, Ser. No. 181,677, filed Mar. 22, 1962, for "Solid State Devices Having Negative Resistance Characteristics and in Which Major Current Flow Is Temperature Dependent," assigned to the assignee of the present case, bistability could be established in certain electrode-insulator-electrode sandwich combinations. Thus, I found that upon completion of the process as described in the aforesaid copending application, if the device is subjected to a second voltage potential less than the first voltage potential and this is continued for a sufficient period of time, the bistability characteristic of these new devices will be obtained. I later discovered that any tendency toward erratic performance of these bistable device could be prevented by subjecting them to a conditioning pulse prior to carrying out the breakdown process disclosed and claimed in the aforesaid copending application, thus making the present process in its preferred form a three-step operation. Additionally, I found that if the final breakdown step is carried out (or repeated) while the entire device is maintained at a temperature from about 60° C. to an upper limit fixed by the melting point temperature or decomposition temperature of a part of the device, the characteristics of the final device will be significantly less sensitive to changes in ambient temperature than when the final breakdown step is carried out at room temperature.

Briefly described, these novel bistable devices comprise in each instance a first electrode, a niobium oxide insulator and a second electrode in a sandwich-like arrangement with niobium oxide in the form of a continuous film from 200 to 3000 Angstroms thick disposed between and separating the said electrodes in contacting the opposed surfaces of the electrodes. The second electrode is preferably of bismuth.

In its method aspect, this invention comprises the steps of subjecting to two separate breakdown operations a device as described above so that the bistability characteristic of these new devices is established. Thus, in every instance in carrying out this method, there is a first operation to effect breakdown which comprises impressing a first voltage potential across the film of niobium oxide for a first period of time, this first voltage potential and period of time being sufficient to effect a marked increase in the current flowing across the oxide film at the end of the first time period as compared with the current flowing across that film at the beginning of that period. The second breakdown operation, then, comprises impressing a second voltage potential less than the first voltage potential across the niobium oxide film for a second period of time, the second voltage potential and second period of time being sufficient to effect a marked increase in the conductance of the niobium oxide film at the end of the second period of time as compared with the conductance of the said film at the beginning of the said second time period. Due care is taken during both breakdown operations to limit the current flowing across the oxide film to less than about 10 milliamperes.

With reference to the drawings accompanying and forming a part of this specification:

Figure 1:
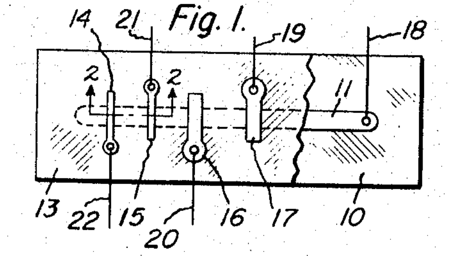
FIG. 1 is a plan view of a memory array including four bistable elements or devices of this invention in a preferred form.
Figure 2:
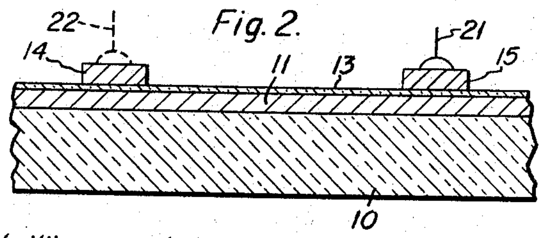
FIG. 2 is a fragmentary, transverse, sectional view of the device of FIG. 1 taken on line 2—2 thereof.

The apparatus of FIGS. 1 and 2 comprises a glass slide 10 and a vapor-deposited niobium strip 11 approximately 10,000 Angstroms thick. In this case, the strip 11 is 3 mm. wide and 155 mm. long, while the glass slide is approximately one inch wide by three inches long, the niobium strip being centered as illustrated along the long axis of the slide. A coating or film or layer 13 of niobium pentoxide ($Nb_2O_5$) is disposed on the top surface of strip 11, suitably being formed by an anodization process as will be described in detail below, and being of approximately 1200 Angstroms in thickness.

Four bismuth counterelectrodes 14, 15, 16 and 17 are disposed transversely of strip 11 at intervals along its length in the form of films having a long dimension at right angles to the axis of slide 10. These bismuth films are each provided with widened contact areas at one end and are formed by evaporation onto the anodized or oxidized niobium strip so that they contact the niobium oxide film, sandwiching it between bismuth electrode and the niobium strip. The thickness of these electrodes is substantially uniform, as in the cases of both strip 11 and film 13, and is approximately 4000 Angstroms.

Four separate and independent bistable devices of this invention are thus provided in the apparatus of FIGS. 1 and 2 which may serve to store four binary digits of information. Thus, in each of the four cases, the diode device has one or the other of two conduction states in which the niobium and bismuth electrodes behave as though connected by a resistor of the order of 300 or 3000 ohms according to the present state of the device and the device retains indefinitely whichever of these characteristics it presently has. In order to switch the device from the 300 ohm to the 3000 ohm state, a pulse is applied with the bismuth electrode being more negative than the threshold indicated as $T_1$ of FIG. 5. For the opposite transition to the 300 ohm state, one applies a pulse which will make the bismuth electrode more positive than the threshold designated $T_2$ of FIG. 5. The stability of the devices of FIGS. 1 and 2 is not affected by the storage of the opposite state in adjacent sites on the same niobium film 11.

As indicated above in the general statement of scope of novelty of this invention in its device aspect, the central novel feature is bistability of a diode incorporating a niobium oxide insulating film or layer between opposed electrodes. Thus, the first or base electrode of the apparatus of FIG. 1 may alternatively be of another metal than niobium such as aluminum, copper or other metal on which niobium oxide may be deposited. Similarly, as previously indicated, a second or counter-electrode of a metal other than bismuth may be employed. Also, there is some latitude as to the selection of the dimensions of the base or first electrode and the second or counter-electrode although the thickness of the niobium oxide film is quite critical within the range previously stated. The niobium electrode or base electrode 11 or equivalent metal first electrode may be of any desired thickness dimension but preferably is of the order of one micron thick, this being approximately the maximum thickness that can readily be vapor-deposited. The second electrode may similarly be of thickness as desired and preferably will approach a maximum of one micron since it is preferably also a vapor-deposited element and substantial thickness, especially in the case of electrodes of bismuth, is desirable because it has the tendency to corrode in air.

The first step in the production of a device or an apparatus such as illustrated in FIGS. 1 and 2 in accordance with the method of this invention is to vapor-deposit niobium strip 11 on the cleaned top surface of glass slide 10. Then niobium strip is anodized by a suitable procedure as known to those skilled in the art. Either aqueous or non-aqueous electrolytes may be used. Upon completion of the anodization step, counterelectrode 14 is vapor-deposited over the niobium oxide film 13 and the device is ready for the breakdown treatment leading to the establishment of its memory or bistability characteristics.

Figure 3:
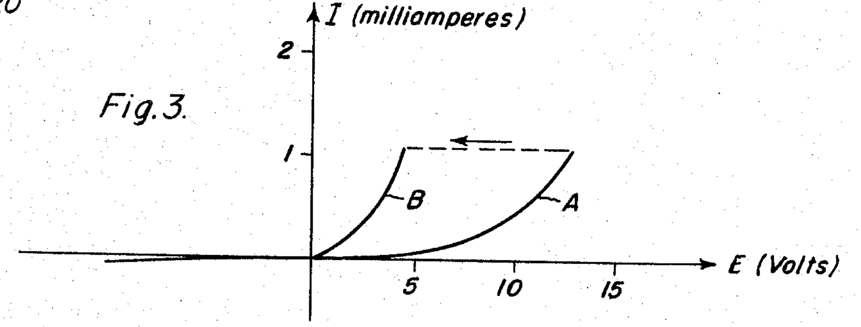
FIG. 3 is a chart bearing curves illustrating the first breakdown step or operation.

As the first step in the preferred practice of this invention in carrying out the breakdown stage, the device is subjected to a single high voltage pulse. Then, in the second step of the breakdown operation, a continuous positive voltage is applied to electrode 14 from a high impedance source until the conductivity of the device abruptly and irreversibly increases by a rather large amount. In the usual operation, a 12- or 13-volt potential is impressed across the niobium oxide film and within from 20 seconds to 300 seconds the sudden increase in electrical conductivity of the device results. This effect is illustrated in FIG. 3 where initially the E-I characteristic of the device is illustrated by Curve A and after this first breakdown occurs, its E-I characteristic is depicted by Curve B, the initial 12 or 13 volts across insulating film 13 dropping to approximately one-half volt as soon as this breakdown occurs. It is important at this stage, particularly if the counterelectrode 14 is bismuth, that negative voltages not be applied or impressed across niobium oxide film 13 since this will adversely affect the ultimate properties of the device, increasing the conductivity of the low conductivity state of the diode.

The third step of this operation and actually the second breakdown step is carried out desirably by slowly increasing the voltage across niobium oxide film 13. The voltage impressed across the film in this step, however, is substantially less than that applied in the prior breakdown step, suitably being of the order of about four volts. Again, the breakdown occurs abruptly with the current-voltage relation changing from that depicted by Curve B of FIGS. 3 and 4 to that of Curve C of FIG. 4.

Figure 4:
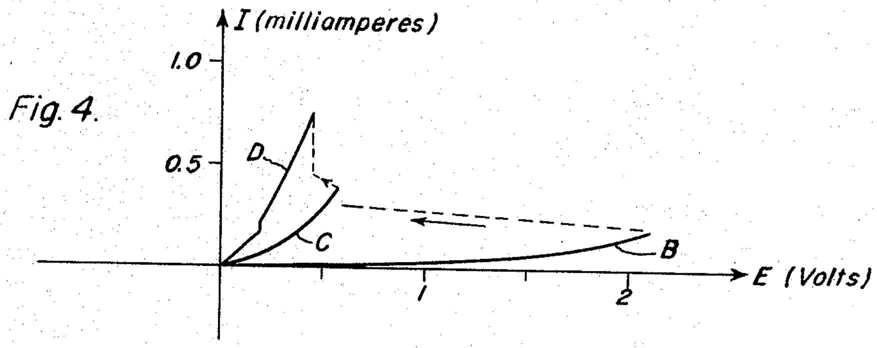
FIG. 4 is a chart like that of FIG. 3 bearing curves illustrating the second and third breakdown operations.

Optionally, still another step may be carried out to produce a third breakdown effect by again subjecting the device to a voltage potential across oxide film 13 with a current of about 0.8 milliampere with the result that the current-voltage relationship abruptly shifts from that depicted by Curve C of FIG. 4 to that of Curve D of the same figure. If this final step is carried out or repeated with the entire device maintained at a temperature in excess of 60° C., the final device characteristics will be less sensitive to the changes in ambient temperature than when final breakdown is carried out at room temperature.

Figure 5:
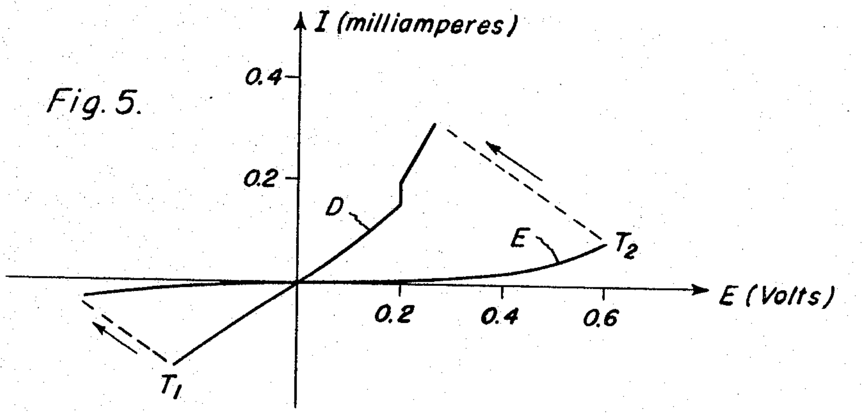
FIG. 5 is still another chart bearing curves illustrating the characteristic bistability of a novel device of this invention.

With reference to FIG. 5, a typical device as illustrated in FIG. 1 and any one of the four elements therein will have two distinct states of conductivity—a low state as illustrated by Curve E and a high state depicted by Curve D.

For a further and better understanding of this invention by those skilled in the art, the applicant offers the following illustrative, but not limiting, example of this invention in a preferred form as it has actually been carried out in the preparation and testing of one of these novel bistable diode devices:

*Example*

A strip of niobium 3000 Angstroms thick was vapor-deposited through a stainless steel mask onto carefully cleaned 1" x 3" glass microscope slide 3 mm. in width and 155 mm. in length so that the strip was centered along the long axis of the slide. The niobium used was of high purity and in the form of a pellet approximately ½" long and ¼" in diameter. This pellet was heated in vacuum on a flat, water-cooled, copper platform by electron beam bombardment using a beam input power of 1.8 to 2.0 kw. (90 to 100 ma. at 20 kv.). The walls of the vacuum system were stainles steel with leaded glass viewing ports. The niobium vaporization was started after chamber pressure had been reduced to $5.10^{-6}$ mm. Hg. Evolution of dissolved gases from the niobium caused the pressure to increase to $\sim 5.10^{-5}$ during deposition which required approximately 10 minutes to produce a niobium film of approximately one micron thickness. The deposited niobium was bright, hard and intimately bonded to the clean surface of the glass substrate.

After deposition, the niobium strip substrate was anodized, except for about 10 mm. at one end, using as a cathode a plutonium wire. An 0.1 normal aqueous solution of KOH was used as the electrolyte. Temperature of the electrolyte was maintained at 50° C., while the current density used was 2 ma. per cm.$^2$ of geometric area.

The final cell potential was 60 volts. The anodized film was tough, tightly adherent, and microscopically structureless.

Upon completion of the anodization, the film was rinsed in running water for a minute or so, then rinsed in distilled water and dried in a slightly heated vacuum desiccator.

Thin bismuth film electrodes in the shape of rectangular strips 3 mm. wide at right angles to the anodized strip and with widened contact areas at one end were evaporated onto the anodized niobium strip and glass substrate. The thickness of these was approximately 1000 Angstroms.

Lead 18 was attached to strip 11 and leads 19, 20, 21 and 22 were attached to bismuth strips 14, 15, 16 and 17 by means of indium solder.

The first step in the electrical conditioning of the resulting device was to apply a single high voltage pulse driving the bismuth electrode positive. This was done by adjusting a pulse generator to produce a single one microsecond pulse of 50-volt amplitude and connecting the positive terminal of the pulse generator through a 1500-ohm series resistor to the bismuth electrode of the device. The negative terminal of the pulse generator was returned to the niobium terminal of the device.

Application of such a pulse does not significantly alter the current-voltage characteristic of the device as observed at this stage of the process. It has been found to be extremely effective, in fact essential, if the final device characteristics are to be stable. Deletion of this step has been found to result in devices whose final characteristics are subject to erratic, spontaneous fluctuations.

The second step in the conditioning operation was the first breakdown step and this involved applying a continuous positive voltage to the bismuth electrode from a high impedance source for as long as necessary to cause the device to increase its conductivity abruptly (and irreversibly) by a large amount. Specifically, and adjustable voltage source with a series resistor of at least 40,000 ohms was connected to the device so as to make the bismuth electrode positive. The voltage was then adjusted so as to produce a voltage across the device of 12 to 13 volts. When such a voltage is maintained for a period of time which has been found to vary between 20 seconds to 300 seconds, a sudden increase in the electrical conductivity of the device occurs. This event was observed by monitoring the voltage across the device. The voltage suddenly changed from the initial value of 12–13 volts to approximately one-half volt. The output voltage of the supply was promptly reduced to zero as soon as this breakdown occurred. A test revealed the current-voltage relation of the device to be that represented by Curve B of FIG. 3, having shifted from Curve A which was the characteristic at the outset of this first breakdown step.

The third step in the breakdown procedure consisted in slowly increasing the voltage across the device using the same voltage source as in the immediately previous step with the series resistance reduced to 3500 ohms.

The second breakdown transition was abrupt, much like the first, the current-voltage characteristic shifting from that represented by Curve B (FIGS. 3 and 4) to Curve C. A third breakdown step was carried out thereafter by increasing the output of the voltage source, the transition represented by the shift to Curve D was accompanied by oscillations. The peak current reached during this final breakdown did not exceed about 0.8 ma.

Having thus described this invention in such full, clear, concise and exact terms as to enable any person skilled in the art to which it pertains to make and use the same, and having set forth the best mode contemplated of carrying out this invention, I state that the subject matter which I regard as being my invention is patricularly pointed out and distinctly claimed in what is claimed, it being understood that equivalents or modifications of, or substitutions for, parts of the specifically-described embodiments of the invention may be made without departing from the scope of the invention as set forth in what is claimed.

What I claim as new and desire to secure by Letters Patent of the United States is:

1. A method of improving the electrical properties of a thin film structure comprising a first electrode of niobium, a film of niobium pentoxide on said niobium electrode, and a second electrode of bismuth, said pentoxide film having a thickness in the range of 200 to 3000 Angstroms and being positioned between and in contact with said first and second electrodes, which method comprises impressing a first voltage potential across said film of niobium oxide for a first period of time, said first voltage potential and said first period of time being sufficient to effect a marked increase in the current flowing across said oxide film at the end of said first time period as compared with the current flowing across said oxide film at the beginning of said first time period, the current flowing across the said oxide film at the end of said first time period being less than about 10 milliamperes, and thereafter impressing a second voltage potential less than said first voltage potential across said film of niobium oxide for a second period of time, said second voltage potential and said second period of time being sufficient to effect a marked increase in the conductance of the said oxide film at the end of said second time period as compared with the conductance of the said oxide film at the beginning of said second period of time, the current flowing across said oxide film at the end of said second period of time being less than about 10 milliamperes.

2. A method of improving the electrical properties of a thin film structure comprising a first metal electrode, a film of niobium oxide on said first electrode, and a second metal electrode, said oxide film having a thickness in the range of 200 to 3000 Angstroms and being positioned between and in contact with said first and second electrodes, which method comprises impressing a first voltage potential across said oxide film for a first period of time, said first voltage potential and said first period of time being sufficient to effect a marked increase in the current flowing across said oxide film at the end of said first time period as compared with the current flowing across said oxide film at the beginning of said first time period, the current flowing across the said oxide film at the end of said first time period being less than about 10 milliamperes, and thereafter impressing a second voltage potential less than said first voltage potential across said oxide film for a second period of time, said second voltage potential and said second period of time being sufficient to effect a marked increase in conductance of the said oxide film at the end of said second time period as compared with the conductance of the said oxide film at the beginning of said second period of time, the current flowing across said oxide film at the end of said second time period being less than about 10 milliamperes.

3. A method of improving the electrical properties of a thin film structure comprising a first metal electrode, a film of niobium oxide on said first electrode, and a second metal electrode, said oxide film having a thickness in the range of 200 to 3000 Angstroms and being positioned between and in contact with said first and second electrodes, which method comprises the steps of subjecting the niobium oxide film to a high voltage pulse and thereby within one microsecond establishing across the said oxide film a potential of approximately 10 volts so as to condition said oxide film for subsequent electrical breakdown processing, then impressing a first voltage potential across said film of niobium oxide for a first period of time, said first voltage potential and said first period of time being sufficient to effect a marked increase in the current flowing across said oxide film at the end of said first time period as compared with the current flowing across said oxide film at the beginning of said first time period, the current flowing across the said oxide film at the end of said first time period being less than about 10 milliamperes, and thereafter impressing a second voltage potential less than said first voltage potential across said film of niobium oxide for a second period of time, said second voltage potential and said second period of time being sufficient to effect a marked increase in conductance of the said oxide film at the end of said second time period as compared with the conductance of the said oxide film at the beginning of said second period of time, the current flowing across the said oxide film at the end of said second period of time being less than 10 milliamperes.

4. A method of improving the electrical properties of a thin film structure comprising a first electrode of niobium, a film of niobium pentoxide on said niobiub electrode, and a second electrode of bismuth, said pentoxide film being of substantially uniform thickness of about 1200 Angstroms and being positioned between and in contact with said first and second electrodes, which method comprises the steps of subjecting the niobium pentoxide film to a conditioning pulse of one microsecond duration with the bismuth electrode being the positive one, then impressing a first voltage potential across said film of niobium oxide for a first period of time, said first voltage potential and said first period of time being sufficient to effect a marked increase in the current flowing across said oxide film at the end of said first time period as compared with the current flowing across said oxide film at the beginning of said first time period, the current flowing across said niobium oxide film at the end of said first time period being less than about 10 milliamperes, and thereafter impressing a second voltage potential less than said first voltage potential across said film of niobium oxide for a second period of time, said second voltage potential and said second period of time being sufficient to effect a marked increase in conductance of the said oxide film at the end of said second time period as compared with the conductance of the said oxide film at the beginning of said second period of time, the current flowing across the said oxide film at the end of said second time period being less than about 10 milliamperes.

No references cited.

WILLIAM I. BROOKS, *Primary Examiner.*